(12) United States Patent
Liu et al.

(10) Patent No.: US 6,562,420 B2
(45) Date of Patent: May 13, 2003

(54) LIQUID CRYSTAL ALIGNING FILM

(75) Inventors: Yi-Chun Liu, Hsinchu (TW);
Hui-Lung Kuo, Taipei (TW);
Chein-Dhau Lee, Hsinchu (TW);
Jing-Pin Pan, Hsinchu (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 0 days.

(21) Appl. No.: 09/917,753

(22) Filed: Jul. 31, 2001

(65) Prior Publication Data

US 2003/0036624 A1 Feb. 20, 2003

(51) Int. Cl.$^7$ .......................... C08G 73/10; C08L 77/00; C09K 19/00
(52) U.S. Cl. ....................... 428/1.1; 428/1.2; 428/1.26; 428/473.5; 528/170; 528/310; 528/322; 528/353; 525/432; 525/436; 522/164
(58) Field of Search .................. 428/1.1, 1.2, 1.26, 428/473.5; 528/353, 170, 272, 310; 525/432, 436; 522/164

(56) References Cited

U.S. PATENT DOCUMENTS

| 5,276,132 | A | * | 1/1994 | Nishikawa et al. ......... 528/353 |
| 5,698,135 | A | * | 12/1997 | Nishikawa et al. ......... 528/353 |
| 5,858,274 | A | * | 1/1999 | Mishina et al. ............ 428/1.26 |
| 5,954,999 | A | * | 9/1999 | Mishina et al. ............ 428/1.26 |
| 6,080,832 | A | * | 6/2000 | Chen et al. ................. 528/170 |
| 6,265,520 | B1 | * | 7/2001 | Kuo et al. .................. 528/170 |

FOREIGN PATENT DOCUMENTS

JP          0202023168 A    *    1/2002

* cited by examiner

Primary Examiner—P. Hampton-Hightower
(74) Attorney, Agent, or Firm—Bacon & Thomas

(57) ABSTRACT

The present invention provides a kind of liquid crystal aligning film composition used for liquid crystal display (LCD), in which the liquid crystal aligning film composition used for LCD is a polyimide resin oligomer (A) having the structural formula (I) as shown in the following: wherein m is an interger of 1, 2, and 3, R is selected one of from aromatic and cyclicaliphatic, X is selected from the group containing amide, ester, and ether etc., Y is the group of containing cholesterol structure; this polyimide resin oligomer (A) and the second reagent (B) are mixed together, through an induced process (C), to produce a thin film for aligning liquid crystal molecule.

14 Claims, 3 Drawing Sheets

|  | pretilt angle | alignability | toughness | Voltage holding ratio(%) | Charge accumulation by direct current(v) |
|---|---|---|---|---|---|
| M-1 | 5.2 | better | minor | 98 | 0.12 |
| M-2 | 5.2 | better | minor | 98 | 0.04 |
| M-3 | 5.2 | better | minor | 97 | 0.10 |
| M-4 | 5.2 | better | minor | 98 | 0.10 |
| M-1* | 4.6 | better | minor | 97 | 0.12 |
| M-1** | 3.5 | better | minor | 97 | 0.12 |
| M-1*** | 5.2 | better | medium | 97 | 0.14 |
| PAA-1 | 2.3 | better | major | 85 | 1.3 |
| PAA-1+PI-2 | 2.5 | better | major | 98 | 0.06 |

Fig.4

LIQUID CRYSTAL ALIGNING FILM

BACKGROUND OF INVENTION

1. Field of Invention

The present invention is to provide a kind of liquid crystal aligning film composition used for LCD, in which the liquid crystal aligning film composition used for LCD is a containing cholesterol structure of polyimide resin oligomer (A) mixed with the second reagent (B), through an induced process (C), to produce a thin film for aligning liquid crystal molecule.

2. Description of the Prior Art

LCD plays an extremely important role in the electroptical industry; especially, it was developing very quickly in recent years. According to the application of electrical devices is widely developed, demands of LCD are also increasing fast, small size panel such as a personal celluar telephone and a personal digital assistant (PDA), large size panel such as a notebook computer and liquid crystal monitor (LCD monitor), and the like. In recent years, due to the promotion of manufacturing technique and the participation of related material industry the application of LCD is developing to the more advanced level, and the prospect is very positive.

At present, the aligning method most widely used in LCD industry is to rub the coated aligning film substrate plate toward to one direction with a mechanical force, and liquid crystal molecule can be generated the uniform and stable aligning effect, said as rubbing treatment. The advantages of this method are effective mass production as well as stable aligning effect. However, at present, since the aligning polymer film has no sufficient toughness, after rubbing, it is easily separated from the substrate plate or causes crack. After assembling to LCD, this kind "injured" aligning film can absorb ionic charge with giving voltage; and after relieving voltage, the residue voltage can be accumulated. Residue voltage causes to the image sticking effect in the picture and contrast decreasing. In addition, since the aligning film is not capable of rubbing resist, it produces a lot of tiny particles and dust, and it causes to the partial discharge effect during giving voltage, and it would hurt the aligning film itself and indium tin oxide (ITO) electrode or thin film transistor (TFT). Also, the formation of defects on the surface of aligning film would cause phase distortion and light scattering to lower down the display quality.

Especially, in the super twisted nematic liquid crystal display (STN-LCD) manufacturing process it needs much stronger rubbing treatment and larger allowed margin, therefore, the rubbing resistibility for aligning film is more critical.

In general, LCD aligning agent is almost made of polyimide material, which is obtained from dianhydride and diamine via polymerization addition, and the components what they are used are in accordance with the characteristics of obtained polyimide products.

U.S. Pat. No. 5,698,135 discloses a kind of improved rubbing resistibility of aligning film by using several aliphatic dianhydrides. However, the claimed aliphatic anhydride has no good reactivity to cause the synthetic reaction be difficult.

Japan Patent 9-185065 discloses a kind of increasing rubbing resistibility of aligning film by using thermal crosslinking compound, however, the residue voltage is still too high, and it is unsuitable for high grade LCD.

It desires to reach much better requirements of electrical property for aligning film such as high voltage holding ratio (VHR), low charge-accumulation by a direct current voltage, and the like. It refers to Japan Patent 64-4720, Japan Patent 10-183118, U.S. Pat. Nos. 5,858,274 and 5,954,999, which disclose the method, e.g. mixing a polyamic acid resin and a solvent-solube polyimide resin solution with an appropriate ratio, according to the characteristic of material itself polyamic acid possesses low direct current residue voltage, rubbing resistance, low image sticking, and good printing properties; and a solvent-soluble polyimide possesses the advantages of high voltage holding and low baking temperature, after mixing, it would to promote the electrical properties; however, since the portion of a solvent-soluble polyimide is less rubbing resistance, therefore, it still has serious problems of powder dust and film stripped off etc. In addition, U.S. Pat. No. 5,954,999 discloses a kind of controlling pretilt angle method, in which a long-chain alkyl group is subjected to a solvent-soluble polyimide, the drawback of this method is that since a long-chain alkyl group is not able to give steric hindrance effectively to cause the problems, e.g. the long-chain itself easily rotates, the pretilt angle is unstable, and aligning uniform decreases. Also, the difficulty control the pretilt angle of LC cell is very worried about to.

SUMMARY OF THE INVENTION

Hence, the primary object of the present invention is to solve the drawbacks described above. In order to avoid the presence of the drawbacks described above, the present invention is to provide a kind of liquid crystal aligning film composition used for LCD, which is not easily to cause the rubbing injure and powder dust. The other object of the present invention is to provide a kind of liquid crystal aligning film composition used for LCD, which can keep high voltage holding ratio and low charge-accumulation by a direct current voltage.

The other object of the present invention is to provide a kind of liquid crystal aligning film composition used for LCD, which is no image sticking.

The other object of the present invention is to provide a kind of liquid crystal aligning film composition used for LCD, which can fit to the high and/or low pretilt angle for various display application.

The other object of the present invention is to provide a kind of liquid crystal aligning film composition used for LCD, which is easy for the synthetic reaction process.

In order to reach the objects described above, the present invention is referred to that a containing cholesterol structure polyimide resin oligomer (A) and the second reagent (B) are mixed together, through an induced process (C), to produce a thin film for aligning liquid crystal molecule, which can be easily synthesized, has high rubbing resistance, and can fit to the high and/or low pretilt angle for various display application.

BRIEF DESCRIPTION OF THE DRAWINGS

FIG. 4 illustrates the examination results of examples for the present invention.

DETAILED DESCRIPTION OF THE PREFERRED EMBODIMENTS

Figure 1:
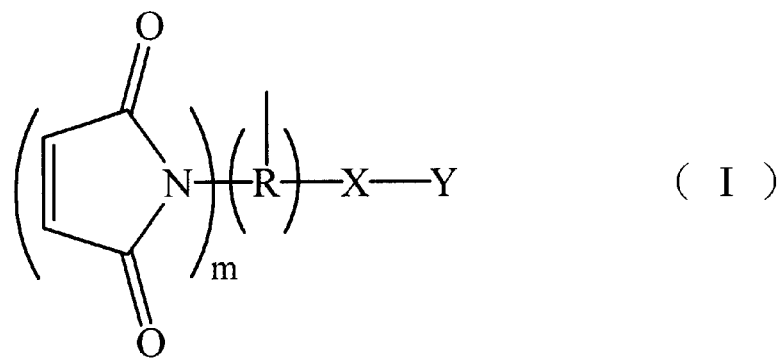
FIG. 1 illustrates the structural formula of polyimide resin oligomer for the present invention.

A kind of liquid crystal aligning film composition used for LCD is comprising of a polyimide resin oligomer (A), the second reagent (B), and an induced process (C). FIG. 1 shows that it refers to the structural formula of a polyimide resin oligomer for the present invention, wherein m is an interger of 1, 2, and 3, R is selected one of from aromatic and cyclicaliphatic, X is selected from the group containing amide, ester, and ether etc., Y is the group of containing cholesterol structure, a polyimide resin oligomer (A) in the resin solution, a weight ratio is 1~30%, optimization can be 6~20%.

The group of containing cholesterol structure Y can be selected from one of the following compounds: androsterone and its derivative, cholesterol and its derivative, corticosterone acetate and its derivative, epiandrosterone and its derivative, ergosterol and its derivative, methyltestosterone and its derivative, lanosterol and its derivative, mestranol and its derivative, pregsterone and its derivative, β-sitosterol and its derivative, stiamasterol and its derivative, testoserone and its derivative, estrylamine and its derivative, norethisterone and its derivative, pregnenoryl chloride and its derivative, and 17-(1,5-dimethylhexyl)-10,13-dimethylhexadecahydrocyclopenta[a]phenanthrene, etc.

Figure 2:
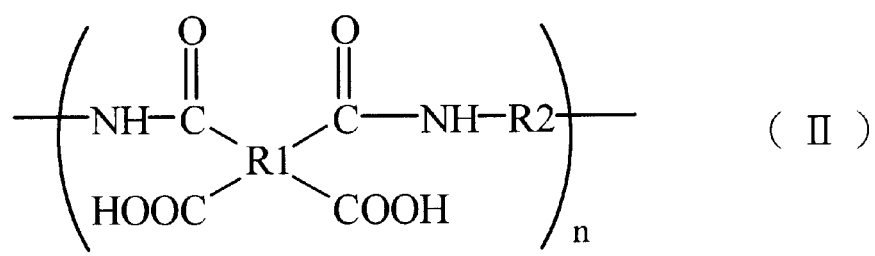
FIG. 2 illustrates the structural formula of polyamic acid for the present invention.
Figure 3:
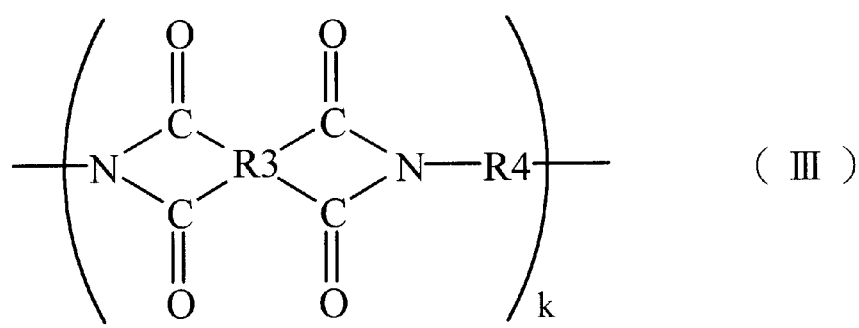
FIG. 3 illustrates the structural formula of a solvent-soluble polyimide resin for the present invention.

The second reagent (B) can be selected from one of the following compounds: polyamic acid, a solvent-soluble polyimide resin, and a mixture of polyamic acid and solvent-soluble polyimide resin, wherein a solvent-soluble polyimide resin and the polyamic acid were mixed at a weight ratio of 1/4~4/1, optimization can be 1/3~3/1, etc. FIG. 2 shows that it refers to the structural formula of polyamic acid for the present invention, wherein R1 is a tetravalent organic group, R2 is a bivalent organic group, and n is a positive interger. FIG. 3 shows that it refers to the structural formula of a solvent-soluble polyimide resin for the present invention, wherein R3 is a tetravalent organic group, R4 is a bivalent organic group, and n is a positive interger.

An induced process comprises of anion initiating polymerization (C), heat initiating polymerization, addition of peroxide initiating polymerization, UV light initiating polymerization, and γ-ray initiating polymerization.

EXAMPLE 1

The Present Invention

Placed 26.7 g of benzene-1,4-diamine, 14.3 g of 3,5-diaminobezoic acid-17-(1,5-dimethylhexyl)-10,13-dimethylhexadecahydrocyclopenta[a]phenanthren-3-yl ester, 52.3 g of benzo[1,2-c;4,5-c']difuran-1,3,5,7-tetraone, and 6.7 g of furan-2,5-dione in the reaction vessel under N2, added 400 g of dry N-methylprrolidone (NMP), heated at 120~160° C. for 10~12 hours, finally, a polyimide solution was obtained. Addition of 1000 g of methanol produced white precipitates, the precipitates were washed with methanol, filtered, dried at 40° C. to obtain white polyimide resin powder. Dissolved 0.6 g of polyimide resin powder in 9.4 g of dry NMP to give a solvent-soluble polyimide resin solution (PI-1). Placed 30 g of (PI-1) and 0.5 g of 2,2'-azobis (isobutyronitrile) (AIBN) in the reaction vessel under N2, heated at 90~110° C. for 5~6 hours, a solution (PI-1-1) was obtained.

Placed 14.6 g of 2,2-bis[4-aminophenoxy]phenyl] propane and 10.3 g of 5,5'-biisobenzofuranyl-1,3,1',3'-tetraone in the reaction vessel under N2, added dry NMP, and reacted for 3 hours at room temperature to give a polyamic acid solution (PAA-1).

A solvent-soluble polyimide resin solution (PI-1-1) and a solution polyamic acid (PAA-1) were mixed at a weight ratio of 1:9, and diluted with NMP to obtain a mixed resin solution (M-1) having a total solid content concentration of 5%. This aligning film solution was coated on a washed clean ITO substrate plate, and then baked at 200~250° C. in oven, and the substrate plate was taken out and cooled down to the room temperature.

EXAMPLE 2

The Present Invention

Placed 13.69 g of 4,4'-methylene-bis-o-toluidine, 0.99 g of 3,5-diaminobezoic acid-17-(1,5-dimethylhexyl)-10,13-dimethylhexadecahydrocyclopenta[a]phenanthren-3-yl ester, 120 g of m-cresol, and 2.0 g of quinoline in the reaction vessel under N2, after stirring to be dissolved, 16.92 g of benzo[1,2-c;4,5-c']difuran-1,3,5,7-tetraone was added, and then heated at 50~170° C. for 4 hours, finally, a polyimide solution was obtained. Addition of 1000 g of methanol produced white precipitates, the precipitates were washed with methanol, filtered, dried at 40° C. to obtain white polyimide resin powder. Dissolved 0.6 g of polyimide resin powder in 9.4 g of γ-butylrolactone to give a solvent-soluble polyimide resin solution (PI-2).

Placed 14.6 g of 2,2-bis[4-aminophenoxy]phenyl] propane and 10.3 g of 5,5'-biisobenzofuranyl-1,3,1',3'-tetraone in the reaction vessel under N2, added dry NMP, and reacted for 3 hours at room temperature to give a polyamic acid solution (PAA-1).

A solvent-soluble polyimide resin solution (PI-2) and a solution polyamic acid (PAA-1) were mixed at a weight ratio of 3:1, and this mixed solution and a solution (PI-1-1) were mixed at a weight ratio of 9:1, and diluted with NMP to obtain a mixed resin solution (M-2) having a total solid content concentration of 5%. This aligning film solution was coated on a washed clean ITO substrate plate, and then baked at 200~250° C. in oven, and the substrate plate was taken out and cooled down to the room temperature.

EXAMPLE 3

The Present Invention

Placed 26.7 g of benzene-1,4-diamine, 14.3 g of 3,5-diaminobezoic acid-17-(1,5-dimethylhexyl)-10,13-dimethylhexadecahydrocyclopenta[a]phenanthren-3-yl ester, 52.3 g of benzo[1,2-c;4,5-c']difuran-1,3,5,7-tetraone, and 6.7 g of furan-2,5-dione in the reaction vessel under N2, added 400 g of dry N-methylprrolidone (NMP), heated at 120~160° C. for 10~12 hours, finally, a polyimide solution was obtained. Addition of 1000 g of methanol produced white precipitates, the precipitates were washed with methanol, filtered, dried at 40° C. to obtain white polyimide resin powder. Dissolved 0.6 g of polyimide resin powder in 9.4 g of dry NMP to give a solvent-soluble polyimide resin solution (PI-1). Photosensitizer e.g. thioxanthone was then added to obtain a solution (PI-1-2).

Placed 14.6 g of 2,2-bis[4-aminophenoxy]phenyl] propane and 10.3 g of 5,5'-biisobenzofuranyl-1,3,1',3'- tetraone in the reaction vessel under N2, added dry NMP, and reacted for 3 hours at room temperature to give a polyamic acid solution (PAA-1).

A solvent-soluble polyimide resin solution (PI-1-2) and a solution polyamic acid (PAA-1) were mixed at a weight ratio of 1:9, and diluted with NMP to obtain a mixed resin solution (M-3) having a total solid content concentration of 5%. This aligning film solution was coated on a washed clean ITO substrate plate, and then baked at 200~250° C. in oven, and the substrate plate was taken out and cooled down to the room temperature, and was irradiated by UV light.

EXAMPLE 4

The Present Invention

Placed 26.7 g of benzene-1,4-diamine, 14.3 g of 3,5-diaminobezoic acid-17-(1,5-dimethylhexyl)-10,13-dimethylhexadecahydrocyclopenta[a]phenanthren-3-yl ester, 52.3 g of benzo[1,2-c;4,5-c']difuran-1,3,5,7-tetraone, and 6.7 g of furan-2,5-dione in the reaction vessel under N2, added 400 g of dry N-methylprrolidone (NMP), heated at 120~160° C. for 10~12 hours, finally, a polyimide solution was obtained. Addition of 1000 g of methanol produced white precipitates, the precipitates were washed with methanol, filtered, dried at 40° C. to obtain white polyimide resin powder. Dissolved 0.6 g of polyimide resin powder in 9.4 g of dry NMP to give a solvent-soluble polyimide resin solution (PI-1). Placed 30 g of PI-1 and 0.5 g of barbituric acid in the reaction vessel under N2, heated at 100~150° C. for 0.5~6 hours, a solution (PI-1-3) was obtained.

Placed 14.6 g of 2,2-bis[4-aminophenoxy]phenyl]propane and 10.3 g of 5,5'-biisobenzofuranyl-1,3,1',3'-tetraone in the reaction vessel under N2, added dry NMP, and reacted for 3 hours at room temperature to give a polyamic acid solution (PAA-1).

A solution (PI-1-1) and a solution polyamic acid (PAA-1) were mixed at a weight ratio of 1:9, and diluted with NMP to obtain a mixed resin solution (M-4) having a total solid content concentration of 5%. This aligning film solution was coated on a washed clean ITO substrate plate, and then baked at 200~250° C. in oven, and the substrate plate was taken out and cooled down to the room temperature.

EXAMPLE 5

The Present Invention

Placed 27.9 g of benzene-1,4-diamine, 11.7 g of 3,5-diaminobezoic acid-17-(1,5-dimethylhexyl)-10,13-dimethylhexadecahydrocyclopenta[a]phenanthren-3-yl ester, 52.3 g of benzo[1,2-c;4,5-c']difuran-1,3,5,7-tetraone, and 6.7 g of furan-2,5-dione in the reaction vessel under N2, added 400 g of dry N-methylprrolidone (NMP), heated at 120~160° C. for 10~12 hours, finally, a polyimide solution was obtained. Addition of 1000 g of methanol produced white precipitates, the precipitates were washed with methanol, filtered, dried at 40° C. to obtain white polyimide resin powder. Dissolved 0.6 g of polyimide resin powder in 9.4 g of dry NMP to give a solvent-soluble polyimide resin solution (PI-1). Placed 30 g of (PI-1)* and 0.5 g of 2,2'-azobis(isobutyronitrile) (AIBN) in the reaction vessel uder N2, heated at 90~110° C. for 5~6 hours, a solution (PI-1-1)* was obtained.

Placed 14.6 g of 2,2-bis[4-aminophenoxy]phenyl]propane and 10.3 g of 5,5'-biisobenzofuranyl-1,3,1',3'-tetraone in the reaction vessel under N2, added dry NMP, and reacted for 3 hours at room temperature to give a polyamic acid solution (PAA-1).

A solvent-soluble polyimide resin solution (PI-1-1)* and a solution polyamic acid (PAA-1) were mixed at a weight ratio of 1:9, and diluted with NMP to obtain a mixed resin solution (M-1)* having a total solid content concentration of 5%. This aligning film solution was coated on a washed clean ITO substrate plate, and then baked at 200~250° C. in oven, and the substrate plate was taken out and cooled down to the room temperature.

EXAMPLE 6

The Present Invention

Placed 29.2 g of benzene-1,4-diamine, 9.0 g of 3,5-diaminobezoic acid-17-(1,5-dimethylhexyl)-10,13-dimethylhexadecahydrocyclopenta[a]phenanthren-3-yl ester, 52.3 g of benzo[1,2-c;4,5-c']difuran-1,3,5,7-tetraone, and 6.7 g of furan-2,5-dione in the reaction vessel under N2, added 400 g of dry N-methylprrolidone (NMP), heated at 120~160° C. for 10~12 hours, finally, a polyimide solution was obtained. Addition of 1000 g of methanol produced white precipitates, the precipitates were washed with methanol, filtered, dried at 40° C. to obtain white polyimide resin powder. Dissolved 0.6 g of polyimide resin powder in 9.4 g of dry NMP to give a solvent-soluble polyimide resin solution (PI-1). Placed 30 g of PI-1 and 0.5 g of 2,2'-azobis(isobutyronitrile) (AIBN) in the reaction vessel uder N2, heated at 90~110° C. for 5~6 hours, a solution (PI-1-1) was obtained.

Placed 14.6 g of 2,2-bis[4-aminophenoxy]phenyl]propane and 10.3 g of 5,5'-biisobenzofuranyl-1,3,1',3'-tetraone in the reaction vessel under N2, added dry NMP, and reacted for 3 hours at room temperature to give a polyamic acid solution (PAA-1).

A solvent-soluble polyimide resin solution (PI-1-1) and a solution polyamic acid (PAA-1) were mixed at a weight ratio of 1:9, and diluted with NMP to obtain a mixed resin solution (M-1) having a total solid content concentration of 5%. This aligning film solution was coated on a washed clean ITO substrate plate, and then baked at 200~250° C. in oven, and the substrate plate was taken out and cooled down to the room temperature.

EXAMPLE 7

The Present Invention

Placed 26.7 g of benzene-1,4-diamine, 14.3 g of 3,5-diaminobezoic acid-17-(1,5-dimethylhexyl)-10,13-dimethylhexadecahydrocyclopenta[a]phenanthren-3-yl ester, 52.3 g of benzo[1,2-c;4,5-c']difuran-1,3,5,7-tetraone, and 6.7 g of furan-2,5-dione in the reaction vessel under N2, added 400 g of dry N-methylprrolidone (NMP), heated at 120~160° C. for 10~12 hours, finally, a polyimide solution was obtained. Addition of 1000 g of methanol produced white precipitates, the precipitates were washed with methanol, filtered, dried at 40° C. to obtain white polyimide resin powder. Dissolved 0.6 g of polyimide resin powder in 9.4 g of dry NMP to give a solvent-soluble polyimide resin solution (PI-1). Placed 30 g of PI-1 and 0.5 g of 2,2'-azobis (isobutyronitrile) (AIBN) in the reaction vessel uder N2, heated at 90~110° C. for 5~6 hours, a solution (PI-1-1) was obtained.

Placed 14.6 g of 2,2-bis[4-aminophenoxy]phenyl]propane and 10.3 g of 5,5'-biisobenzofuranyl-1,3,1',3'-tetraone in the reaction vessel under N2, added dry NMP, and reacted for 3 hours at room temperature to give a polyamic acid solution (PAA-1).

A solvent-soluble polyimide resin solution (PI-1-1) and a solution polyamic acid (PAA-1) were mixed at a weight ratio of 3:97, and diluted with NMP to obtain a mixed resin solution (M-1)*** having a total solid content concentration of 5%. This aligning film solution was coated on a washed clean ITO substrate plate, and then baked at 200~250° C. in oven, and the substrate plate was taken out and cooled down to the room temperature.

EXAMPLE 8

Comparative Example

Placed 14.6 g of 2,2-bis[4-(4-aminophenoxy)phenyl] propane and 10.3 g of 5,5'-bisisobenzofuranyl-1,3,1',3'-tetraone in the reaction vessel under N2, added dry NMP, and reacted for 3 hours at room temperature to give a polyamic acid solution (PAA-1). A solution (PAA-1) was coated on a washed clean ITO substrate plate, and then baked at 200~250° C. in oven, and the substrate plate was taken out and cooled down to the room temperature.

EXAMPLE 9

Comparative Example

Placed 13.69 g of 4,4'-methylene-bis-o-toluidine, 0.99 g of 3,5-diaminobezoic acid-17-(1,5-dimethylhexyl)-10,13-dimethyl-hexadecahydrocyclopenta[a]phenanthren-3-yl ester, 120 g of m-cresol, and 2.0 g of quinoline in the reaction vessel under N2, after stirring to be dissolved, 16.92 g of benzo[1,2-c;4,5-c']difuran-1,3,5,7-tetraone was added, and then heated at 50~170° C. for 4 hours, finally, a polyimide solution was obtained. Addition of 1000 g of methanol produced white precipitates, the precipitates were washed with methanol, filtered, dried at 40° C. to obtain white polyimide resin powder. Dissolved 0.6 g of polyimide resin powder in 9.4 g of γ-butyrolactone to give a solvent-soluble polyimide resin solution (PI-2).

Placed 14.6 g of 2,2-bis[4-aminophenoxy]phenyl] propane and 10.3 g of 5,5'-biisobenzofuranyl-1,3,1',3'-tetraone in the reaction vessel under N2, added dry NMP, and reacted for 3 hours at room temperature to give a polyamic acid solution (PAA-1).

A solvent-soluble polyimide resin solution (PI-2) and a solution polyamic acid (PAA-1) were mixed at a weight ratio of 3:1, and diluted with NMP to obtain a mixed resin solution having a total solid content concentration of 5%. This aligning film solution was coated on a washed clean ITO substrate plate, and then baked at 200~250° C. in oven, and the substrate plate was taken out and cooled down to the room temperature.

In order to examine the properties of the present invention, the readily prepared aligning film solution was coated on the ITO substrate plate, which was dried by baking and cooled to the room temperature, to proceed the following evaluation tests:

I. The Pretilt Angle of Aligning Film Measurement

Proceed the fixed rubbing direction of a rubbing machine, make a liquid crystal cell for test, fill in with Merck Artical No. ZLI-2293 liquid crystal, finally seal with adhesive to measure the pretilt angle.

II. Alignability Measurement

A driving examined liquid crystal cell is observed whether the abnormal domain is or not by using a polarization microscope.

III. The Toughness of Aligning Film Measurement

The readily prepared containing a aligning film glass substrate plate for test wherein the film thickness of aligning film is about 0.05~0.15 μm, the fixed rubbing condition is: putting amount is 0.5 mm, rotating speed of roller is 1000 rpm, fixed direction times are 40 times, and the speed of movement of platform is 10 cm/min, the surface of a film is subjected to the rubbing treatment, finally observe the surface condition of aligning film before and after rubbing treatment by using a polarization microscope to compare each other. With eyes observing count number of the damaged holes to judge as few, moderate, or many of the comparing results.

IV. Charge-accumulation by a Direct Current Voltage Measurement

After giving a liquid crystal device with the direct current voltage at 10 volt. for 2 hours, measure the largest residue voltage of a liquid crystal device.

V. Voltage Holding Ratio Measurement

After the examined liquid crystal cell is subjected to voltage (60 Hz, IV), and then measure its voltage holding ratio.

Figure 5:
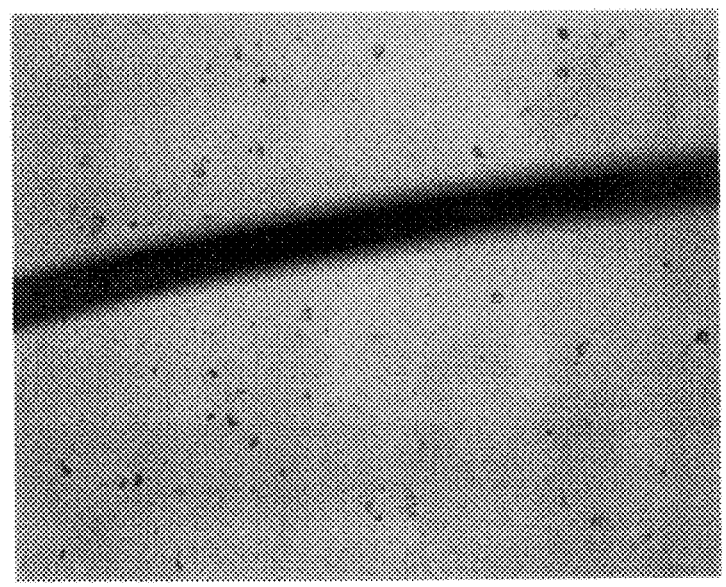
FIG. 5 illustrates measurement of toughness of aligning film for the known technique by using a polarization microscope.
Figure 6:
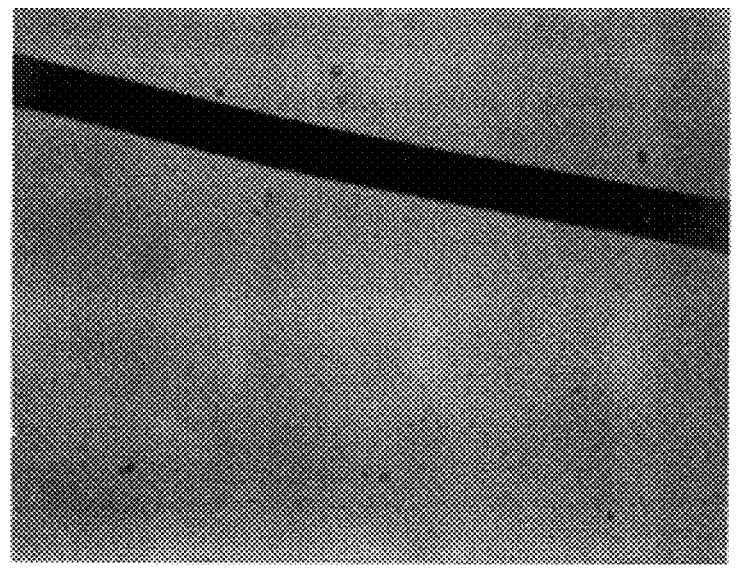
FIG. 6 illustrates measurement of toughness of aligning film for the present invention by using a polarization microscope.

FIG. 4 shows the examination results of the present invention. FIGS. 5 and 6 show the toughness of aligning film measurement for the known technique by using the polarization microscope and the toughness of aligning film measurement for the present invention by using the polarization microscope, respectively. Therefore, a weight ratio of polyimide resin oligomer (A) in the resin solution is 1~30%, optimization is 6~20%. The second reagent (B) can be selected from one of the following compounds: polyamic acid, a solvent-soluble polyimide resin, and a mixture of polyamic acid and solvent-soluble polyimide resin, wherein a solvent-soluble polyimide resin and the polyamic acid were mixed at a weight ratio of 1/4~4/1, optimization can be 1/3~3/1, etc. The present invention specially discloses and describes selected the best examples. It is to be understood, however, that the present invention is not limited to the specific features shown and described. The present invention is claimed in any forms or modifications within the spirit and the scope of the appended claims.

What is claimed is:

1. A liquid crystal aligning film formed by polymerization of reagent (A) with reagent (B) as follows:

(A) which is a polyimide resin oligomer having a structural formula (I)

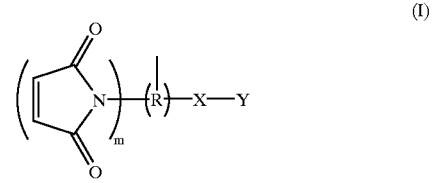

(I)

wherein m is an integer which is 1, 2 or 3; R is an aromatic or cycloaliphatic group; X is a group containing an amide, ester or ether; Y is a group containing a cholesterol structure; and (B) which is a polyamic acid, a solvent-soluble polyimide resin, or a mixture of polyamic acid and a solvent-soluble polyimide resin.

2. A liquid crystal aligning film according to claim 1, wherein Y is cholesterol or its derivative, corticosterone acetate or its derivative, epiandrosterone or its derivative, ergosterol or its derivative, methyltestosterone or its derivative, lanosterol or its derivative, mestranol or its derivative, pregsterone or its derivative, β-sitosterol or its derivative, stiamasterol or its derivative, testoserone or its derivative, estrylamine or its derivative, norethisterone or its derivative, pregnenoryl chloride or its derivative, or 17-(1, 5-dimethylhexyl)-10,13-dimethylhexadecahydrocyclopenta phenanthrene.

3. A liquid crystal aligning film according to claim 1, having a weight ratio of polyimide resin oligomer which is 1~30%.

4. A liquid crystal aligning film according to claim 1, having a weight ratio of polyimide resin oligomer which is 6~20%.

5. A liquid crystal aligning film according to claim 1, wherein the polymerization is induced by heat.

6. A liquid crystal aligning film according to claim 1, wherein the polymerization is UV light initiating polymerization.

7. A liquid crystal aligning film according to claim 1, wherein the structural formula of polyamic acid has the following formula (II):

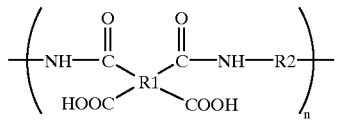
(II)

wherein R1 is a tetravalent organic group, R2 is a bivalent organic group, and n is a positive integer.

8. A liquid crystal aligning film according to claim 1, wherein the structural formula of the solvent-soluble polyimide resin has the following formula (III):

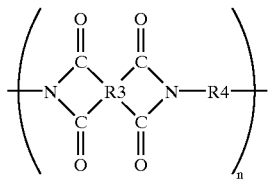
(III)

wherein R3 is a travalent organic group, R4 is a bivalent organic group and n is a positive integer.

9. A liquid crystal aligning film according to claim 1, wherein the polyamic acid and a solvent-soluble resin are mixed at a weight ratio of from 1/4~4/1.

10. A liquid crystal aligning film according to claim 1, wherein the polyamic acid and a solvent-soluble resin are mixed at a weight ratio of from 1/3~3/1.

11. A liquid crystal aligning film according to claim 2, wherein the structural formula of polyamic acid has the following formula (II):

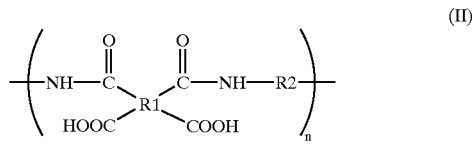
(II)

wherein R1 is a tetravalent organic group, R2 is a bivalent organic group, and n is a positive integer.

12. A liquid crystal aligning film according to claim 2, wherein the structural formula of the solvent-soluble polyimide resin has the following formula (III):

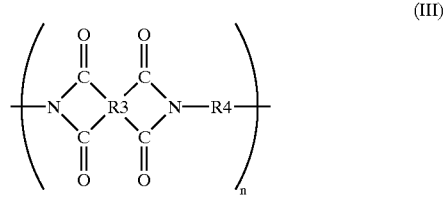
(III)

wherein R3 is a tetravalent organic group, R4 is a bivalent organic group and n is a positive integer.

13. A liquid crystal aligning film according to claim 2, wherein the polyamic acid and a solvent-soluble polyimide resin are mixed at a weight ratio of from 1/4~4/1.

14. A liquid crystal aligning film according to claim 2, wherein the polyamic acid and a solvent-soluble polyimide resin are mixed at a weight ratio of from 1/3~3/1.

* * * * *